April 19, 1949.  H. M. TURNER  2,467,640
FISHING LURE
Filed July 9, 1946
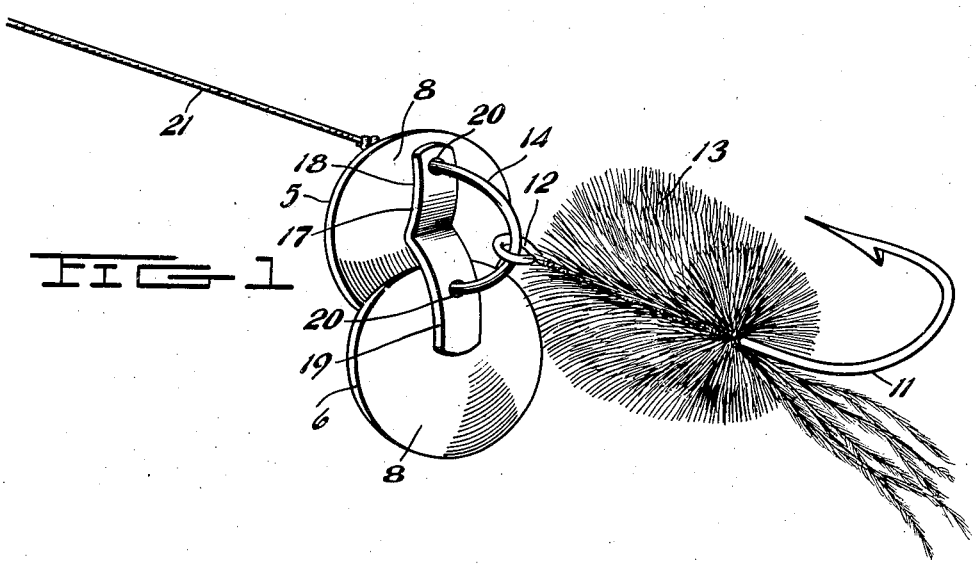
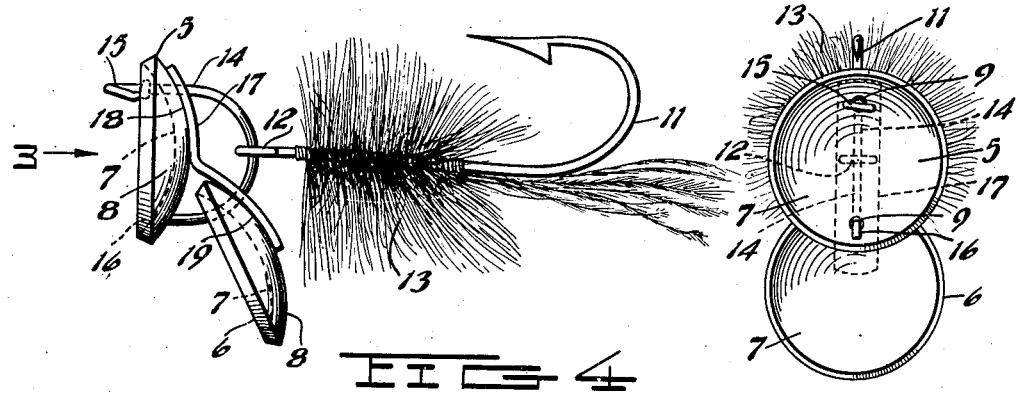
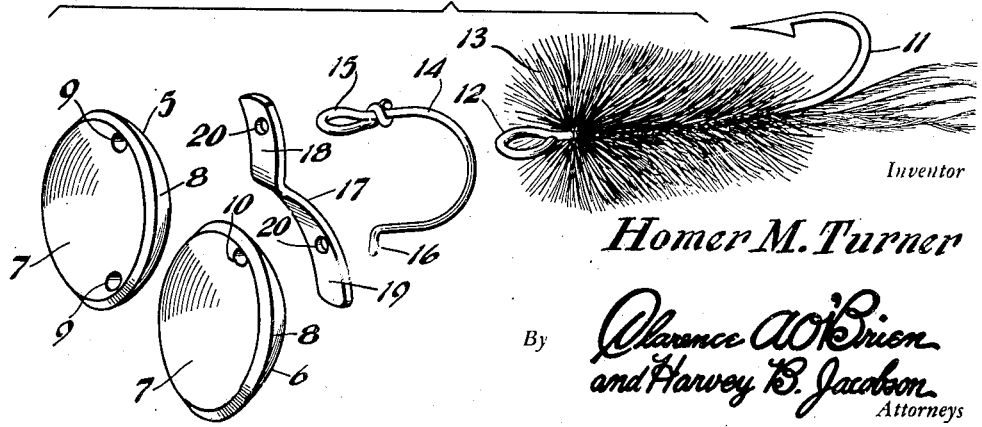
Inventor
Homer M. Turner
By Clarence A. O'Brien
and Harvey B. Jacobson
Attorneys Patented Apr. 19, 1949

2,467,640

UNITED STATES PATENT OFFICE 2,467,640

FISHING LURE

Homer M. Turner, Greenwood, Del.

Application July 9, 1946, Serial No. 682,361

3 Claims. (Cl. 43—42)

This invention relates to new and useful improvements and structural refinements in fishing lures and the principal object of the invention is to provide a device of the character herein described which, by virtue of its construction and operation, presents a realistic, life-like appearance as it moves through water.

A further object of the invention is to provide a fishing lure, the movement of which is accompanied by considerable wiggling motion, thereby enhancing the life-like appearance above referred to.

Another object of the invenition is to provide a fishing lure which is simple in construction and operation and which cannot easily become damaged.

An additional object of the invention is to provide a fishing lure which may be readily connected to or disconnected from the fishing line.

A still further object of the invention is to provide a fishing lure which will readily lend itself to economical manufacture.

With the above more important objects in view, and such other objects as may become apparent as this specification proceeds, the invention consists essentially of the arrangement and construction of parts as illustrated in the accompanying drawings, in which—

Figure 1 is a perspective view of the invention.

Figure 2 is a side elevation thereof.

Figure 3 is an end view of the same, taken substantially in the direction of the arrow 3 in Figure 2, and Figure 4 is an exploded perspective view of the invention.

Like characters of reference are used to designate like parts in the specification and throughout the several views.

Referring now to the accompanying drawings in detail, the invention embodies in its construction a pair of discs 5 and 6, each having concave and convex surfaces 7 and 8 on the relatively opposite sides thereof, as is best shown in Figure 2.

For purposes of convenient reference, the discs will be hereinafter identified as the head disc 5 and the flipper disc 6.

The head disc 5 is provided with a pair of apertures 9 adjacent the marginal edge thereof, while the flipper disc 6 is formed with a further aperture 10 adjacent its marginal edge. The fish hook 11 is of any conventional design and is equipped with the usual attaching eye 12 and with a suitable lure element such as the tuft of feathers 13.

A single piece wire-like rod is arcuated to provide a substantially U-shaped connecting link 14, one end of the latter being formed with a further eye 15. The link 14 passes through the apertures 9 of the head disc 5 and the remaining end thereof is laterally angulated to form a detent 16, whereby the link is retained in position.

It will be noted that the link 14 also passes through the aperture 10 of the flipper disc 6 and that the concave surface 7 of the flipper disc is disposed adjacent the convex surface 8 of the head disc 5.

The eye 12 of the hook 11 is positioned on the mid-portion of the connecting link 14, as will be clearly apparent from the accompanying drawings.

An equalizer bar 17 consisting of a strap arcuated to provide a pair of concave seats 18 and 19, is also formed with an aperture 20 adjacent each end thereof, whereby it may be positioned on the connecting link 14, as is best shown in Figures 1 and 2. It will be observed that the seats 18 and 19 engage the convex surfaces 8 of the discs 5 and 6 respectively.

When the invention is placed in use, the eye 15 of the link 14 is attached to the fishing line 21 and as the lure is moved through water, the concavity 7 of the head disc 5 will displace water and impart motion to the lure. Simultaneously, the concavity of the flipper disc 6 will produce considerable wiggling motion which will be further enhanced by the flexible connection of the various parts, as provided by the connecting link 14.

It will be noted that the equalizer bar 17 is angulated as is best shown in Figure 2, whereby the positional relationship of the discs 5 and 6 will be effectively controlled, that is, the disc 6 will be disposed in a plane angularly off-set with respect to the plane of the disc 5.

It is believed that the advantages and use of the invention will be clearly understood and accordingly, further description thereof at this point is considered unnecessary.

While in the foregoing there has been shown and described the preferred embodiment of this invention it is to be understood that minor changes in the details of construction, combination and arrangement of parts may be resorted to without departing from the spirit and scope of the invention as claimed.

What I claim as my invention:

1. A fishing lure comprising in combination, a pair of discs, each disc having a concave surface on one side and a convex surface on the opposite side thereto, a fish hook including an attaching eye, a substantially U-shaped connecting link passing through said discs and through said eye, an equalizer bar positioned on said link and engaging said discs, and a further eye on said link for attaching said lure to a fishing line.

2. A fishing lure comprising in combination, a head disc and a flipper disc, each having a concave surface on one side and a convex surface on the opposite side thereto, said head disc being formed adjacent the marginal edge thereof with a pair of apertures, said flipper disc being provided with a further aperture adjacent its marginal edge, a fish hook including an attaching eye, a wire rod arcuated to form a substantially U-shaped connecting link, a further eye provided at one end of said link, said link passing through said apertures in said discs and having the remaining end portion thereof laterally angulated to form a detent, the concave surface of said flipper disc being disposed adjacent the convex surface of said head disc, the eye of said hook being adapted to engage an intermediate portion of said link, the eye of said link being attached to a fishing line, and an equalizer bar comprising a strap arcuated to form a pair of concave seats and provided with an aperture adjacent each end thereof, said strap being positioned on said link with said seats engaging the convex surfaces of said discs.

3. In a fishing lure, the combination of a disc, a substantially U-shaped link having end portions thereof connected at diametrically opposite points to said disc, a further disc provided in its marginal portion with an aperture to slidably receive an intermediate portion of said link, means for supporting said discs in a predetermined relative position, and a fish hook having an attaching eye slidable on said link.

HOMER M. TURNER.

REFERENCES CITED

The following references are of record in the file of this patent:

UNITED STATES PATENTS

| Number | Name | Date |
| --- | --- | --- |
| 204,168 | Roney | May 28, 1878 |
| 418,200 | Loftie | Dec. 21, 1899 |
| 1,636,904 | Elwood | July 26, 1927 |
| 1,636,905 | Elwood | July 26, 1927 |
| 1,842,127 | Stickel et al. | Jan. 19, 1932 |
| 1,978,875 | Wright | Oct. 30, 1934 |
| 2,429,568 | Stevermer | Oct. 21, 1947 |